US006988836B2

(12) United States Patent
Wang

(10) Patent No.: US 6,988,836 B2
(45) Date of Patent: Jan. 24, 2006

(54) FIBER OPTICAL CONNECTOR

(75) Inventor: Kun-Sheng Wang, Yungho (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/898,261

(22) Filed: Jul. 26, 2004

(65) Prior Publication Data

US 2005/0078915 A1    Apr. 14, 2005

(30) Foreign Application Priority Data

Oct. 14, 2003 (TW) .............................. 92128425 U

(51) Int. Cl.
 *G02B 6/36* (2006.01)
(52) U.S. Cl. .......................................... 385/92; 385/88
(58) Field of Classification Search .................. 385/88, 385/92
See application file for complete search history.

(56) References Cited

U.S. PATENT DOCUMENTS 5,909,526 A * 6/1999 Roth et al. ..................... 385/78
6,004,043 A * 12/1999 Abendschein et al. ........ 385/76
6,287,016 B1 * 9/2001 Weigel ........................ 385/58

* cited by examiner

*Primary Examiner*—John D. Lee
*Assistant Examiner*—James D. Stein
(74) *Attorney, Agent, or Firm*—Birch, Stewart, Kolasch & Birch, LLP

(57) ABSTRACT

An optical fiber connector for mating with an optical fiber coupling has a housing and a U-shaped portion assembled to the housing. The housing has two clamping grooves respectively formed on upper and lower edges of each opposite lateral outer surface thereof. The U-shaped portion includes a socket frame and two side plates extending from the socket frame. The socket frame includes a shutter downwardly extending from an upper front edge thereof and made integrally in one piece. Each of the side plates has two engaging faces respectively retained in the clamping grooves and arranged on upper and lower edges thereof.

20 Claims, 11 Drawing Sheets

FIBER OPTICAL CONNECTOR

This Nonprovisional application claims priority under 35 U.S.C. § 119(a) on Patent Application No(s). 092128425 filed in Taiwan on Oct. 14, 2003, the entire contents of which are hereby incorporated by reference.

BACKGROUND OF THE INVENTION

1. Field of the Invention

The present invention relates to an optical fiber connector, and particularly relates to an optical fiber connector for light coupling.

2. Background of the Invention

With optical fiber communication developing, requirements for optical fiber connectors are increased. Each optical fiber connector always works with an optoelectronic component, and an entrance of the optical fiber connector must be completely enclosed to prevent dust and other external objects from affecting optical signals and to protect users' eyes from light emitted by the optical fiber connector.

With respect to FIG. 1, a dust-proof bung 12a is removable from a first conventional optical fiber connector 1a to mate with an optical fiber coupling. When the first conventional optical fiber connector 1a isn't in use, the dust-proof bung 12a is inserted into an optical-fiber insertion hole of the first conventional optical fiber connector 1a, thereby to prevent dust and other external objects from affecting optical signals. However, the dust-proof bung 12a must be manually inserted and removed, and should be stored well in order to avoid getting lost. Obviously, the dust-proof bung 12a presents a potential hazard of making children choked if not carefully stored. On the other hand, if the first conventional optical fiber connector 1a is packaged with an electronic apparatus, this assembly requires a testing procedure before shipping. During the testing producer, the dust-proof bung 12a in the packaged assembly is supposed to be removed first, the electronic apparatus is then probed to check functions and characteristics, and then, the dust-proof bung 12a is put back on the housing 11a thereof. The manufacturing steps are so complex to waste time and labor.

Referring to FIGS. 2A and 2B, a second conventional optical fiber connector 2a is open by a lateral side thereof. The second conventional optical fiber connector 2a includes a housing 21a, a supporting spring 23a, and a shuttle 24a. The supporting spring 23a has two ends respectively abutting against a rear surface of the shuttle 24a and an inner side of the housing 21a. The shuttle 24a includes a shaft 22a connected to the housing 21a by a fixed bracket, and the shaft 22a rotates freely and inwardly in order to accept an optical fiber coupling 6a. When the optical fiber coupling 6a is removed from the second conventional optical fiber connector 2a, the supporting spring 23a, which is pressed when the optical fiber coupling 6a is inserted, will release its recovery force to push the shuttle 24a back to enclose the second conventional optical fiber connector 2a.

Generally speaking, the optical fiber coupling 6a usually includes two opposite semi-circular strips protruding from a peripheral thereof for guiding in and mating with at least one guiding groove of the conventional fiber optical connectors. The guiding groove of the second conventional optical fiber connector 2a is formed on a front surface of the shuttle 24a, in order to guide each one of the semi-circular strips of the optical fiber coupling 6a. However, the shuttle 24a connects the fixed bracket via the shaft 22a in advance, and further connects the housing 21a and the supporting spring 23a via the fixed bracket. Therefore, the shuttle 24a is not stable enough to provide a long service life due to tolerances existed between the shuttle 24a, the shaft 22a, the fixed bracket and the housing 21a. In addition, the second conventional optical fiber connector 2a further includes a baffle 25a arranged behind the shuttle 24a to limit an insertion depth of the optical fiber coupling 6a. Because the baffle 25a restricts only single one of the two opposite semi-circular strips, the optical fiber coupling 6a is secured insufficiently to reduce the secure capacity of the second conventional optical fiber connector 2a.

Illustrated in FIGS. 3A and 3B, a third conventional optical fiber connector 3a is open by a topside thereof. The third conventional optical fiber connector 3a includes a housing 31a, a shaft 32a assembled on the housing 31a, a pair of bracket springs 33a and a shuttle 34a covering an entrance of the housing 31a. Each of the bracket springs 33a has two ends, one connects to a rear surface of the shuttle 34a, and the other one connects an inner top surface of the housing 31a, so that the shuttle 34a can rotate inwardly due to the bracket springs 33a. The optical fiber coupling 6a can be inserted in the third optical fiber connector 3a. The shuttle 34a rotates about the shaft 32a to retain against the inner top surface of the housing 31a, when the optical fiber coupling 6a is inserted. Then the shuttles 34a is restored back to its original status by a resilient force thereof, when the optical fiber coupling 6a is removed.

However, the process of inserting the optical fiber coupling 6a may damage the shaft 32a because the shaft 32a endures the weight of the shuttle 34a. To avoid such damages, the shaft 32a should be made of metallic materials, which is stronger and accordingly more expensive than the prior art. The metallic shaft 32a has a spring 33a penetrating through the topside thereof to connect the shuttle 34a. Thus, the third conventional optical fiber connector 3a fails to reduce costs and manufacturing steps.

FIG. 4 shows a fourth conventional optical fiber connector 4a that is open by a topside thereof. The fourth conventional optical fiber connector 4a includes a housing 41a, a spring plate 43, and a shuttle 44a having a shaft 42a. The fourth conventional optical fiber connector 4a has a shortcoming, like the third conventional optical fiber connector 3a, to be overcome. The shaft 42a cannot endure the load, and the service life of the fourth conventional optical fiber connector 4a decreases thereby.

Referring to FIG. 5, a fifth conventional optical fiber connector 5a is open by a bottom side thereof. The fifth conventional optical fiber connector 5a includes a housing 51a and a shuttle 54a extending downwardly from the housing 51a. The shuttle 54a is made of resilient material, in order to bend inwardly. The shuttle 54a can rotate due to the insertion of the optical fiber coupling 6a, and release a resilient force to return when the optical fiber coupling 6a is removed. The housing 51a, as a usual type, has a guiding recess formed on an inner bottom surface in advance; the shuttle 54a encloses an entrance and the guiding recess of the housing 51a simultaneously. For ease to guide the optical fiber coupling 6a, the shuttle 54a includes a substitution guiding recess formed on a front surface to replace the guiding recess the housing 51a. The substitution guiding recess extends from a bottom end to approach a top end of the shuttle 54a, but fails to reach a rear end of the housing 51. Because the shuttle 54a is movable relative to the housing 5a, and only the substitution guiding recess of the shuttle 54 is provided to guide the optical fiber coupling 6a, the connection between the optical fiber coupling 6a and the conventional optical fiber connector 5a lacks stability and accuracy. Furthermore, the resilient shuttle 54a is bent with such frequency to lose flexibility, so that the shuttle 54a eventually cannot recover.

Moreover, the third, the fourth, and the fifth conventional optical fiber connector 3a, 4a, 5a cannot restrict the insertion depth of the optical fiber coupling 6a, and this may results in the optical fiber coupling 6a rubbing against and scraping a surface of the optoelectronic component, so as to reduce or affect the optical signal therefrom.

Hence, an improvement over the prior art is required to overcome the disadvantages thereof.

SUMMARY OF INVENTION

The primary object of the invention is therefore to specify an optical fiber connector that has a rotatable capacity with a durable and simple structure, in order to avoid complicated assembly steps, to prevent the choking hazard for children, to improve a testing efficiency, and to reduce the cost thereof.

The secondary object of the invention is therefore to specify an optical fiber connector to prevent dust and external objects.

The third object of the invention is therefore to specify an optical fiber connector with an idiot-proof design for accurate assembly.

The fourth object of the invention is therefore to specify an optical fiber connector to restrict an insertion depth of a fiber optical coupling, when the fiber optical coupling inserts into the optical fiber connector.

The fifth object of the invention is therefore to specify an optical fiber connector to improve an alignment between the fiber optical coupling and an optoelectronic component that is disposed in the optical fiber connector.

According to the invention, these objects are achieved by an optical fiber connector for matting with a fiber optical coupling. The optical fiber connector includes a housing and a U-shaped portion assembled to the housing. The housing has two clamping grooves arranged on upper and lower edges of each opposite lateral outer surface thereof, respectively. The U-shaped portion includes a socket frame and two side plates connecting the socket frame. The socket frame includes a shutter downwardly extending from an upper front edge thereof. Each of the side plates has two respective engaging faces correspondingly engaging with a respective one of the clamping grooves, and arranged on upper and lower edges thereof.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

FIG. 11B is a perspective view of the optical fiber connector according to the present invention, during the optical fiber coupling inserts thereinto; and.

DETAILED DESCRIPTION OF THE EMBODIMENTS

The present invention provides an optical fiber connector that mates with an optical fiber coupling, and the optical fiber connector utilizes a U-shaped portion assembled to a housing thereof. The housing has two clamping grooves respectively arranged on upper and lower edges of each opposite lateral outer surface thereof, in order to engage with two side plates to connect to a socket frame of the U-shaped portion. The U-shaped portion includes a shutter downwardly extending from an upper front edge thereof. The housing and the U-shaped portion combine as the optical fiber connector with a dust-proof plate. The structure of the present invention is accordingly simple and durably, easy to assemble and to test, so as to increase assembly and testing efficiencies and reduce the costs. The present invention further avoids a choking hazard for children, which might happen in the first conventional optical fiber connector 1a that is made with two pieces.

Figure 1:
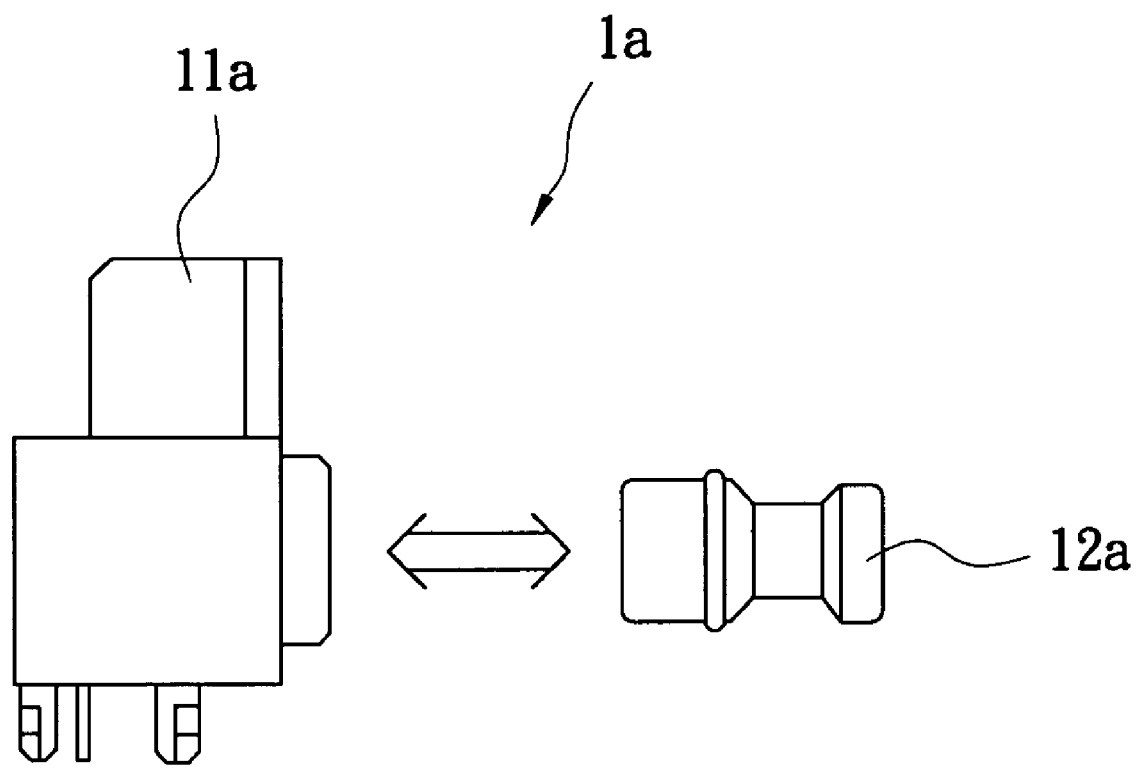
FIG. 1 is a perspective view according to an application a first conventional optical fiber connector.
Figure 2A:
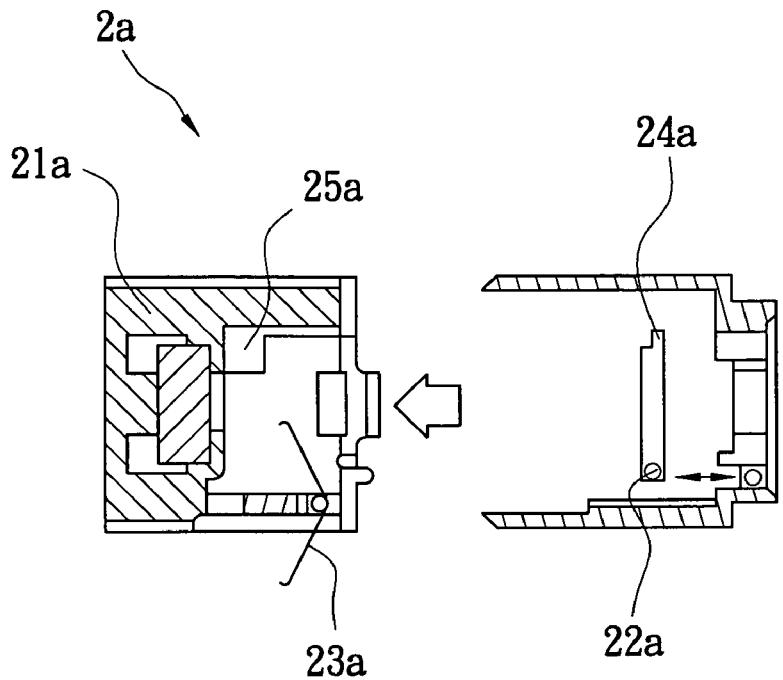
FIG. 2A is a perspective view of a second conventional optical fiber connector.
Figure 2B:
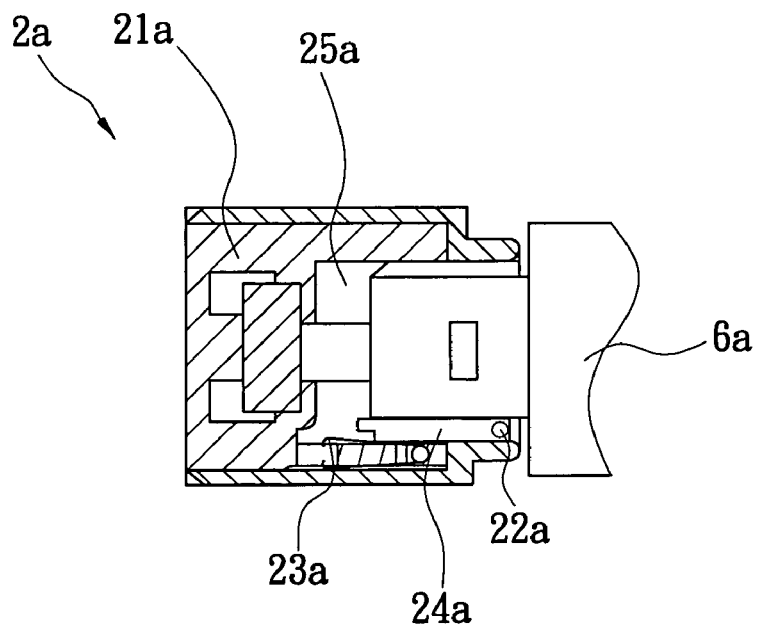
FIG. 2B is a perspective view according to an application of the second conventional optical fiber connector.
Figure 3A:
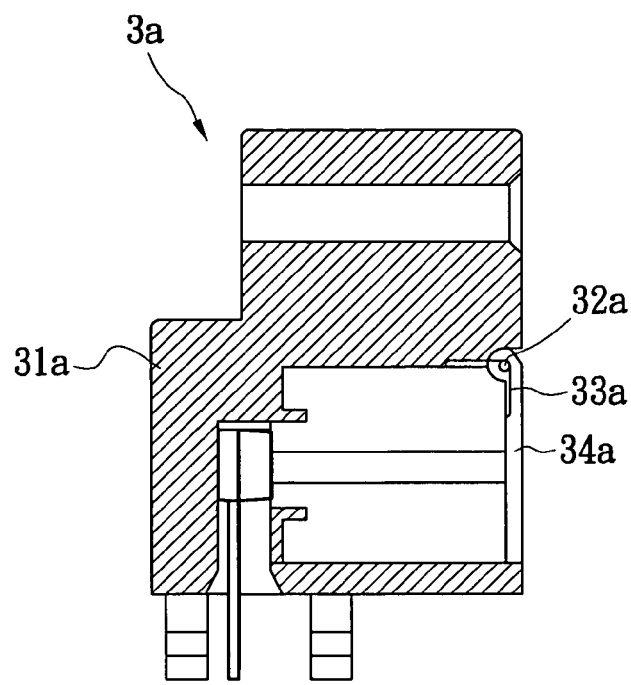
FIG. 3A is a perspective view of a third conventional optical fiber connector.
Figure 3B:
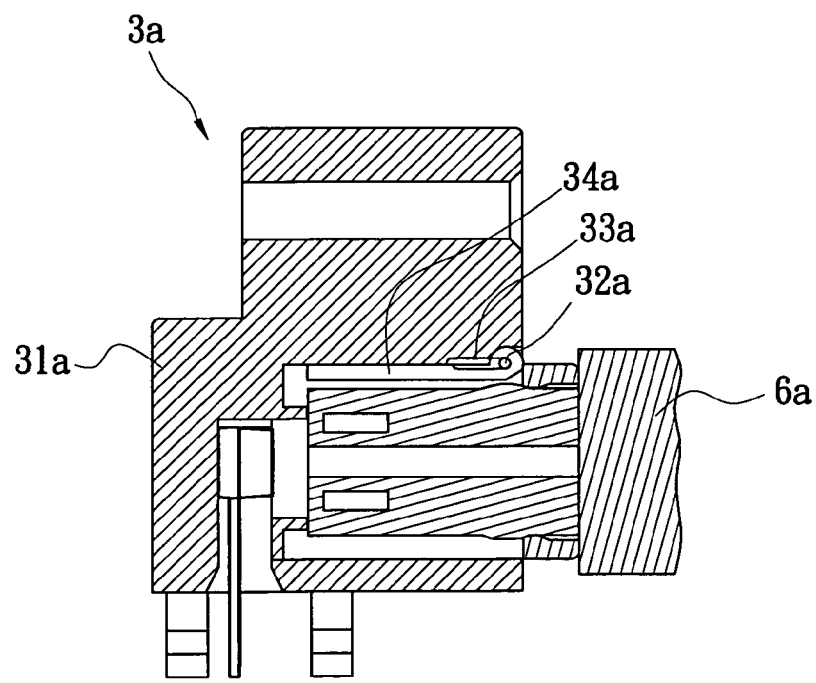
FIG. 3B is a perspective view according to an application of the third conventional optical fiber connector.
Figure 4:
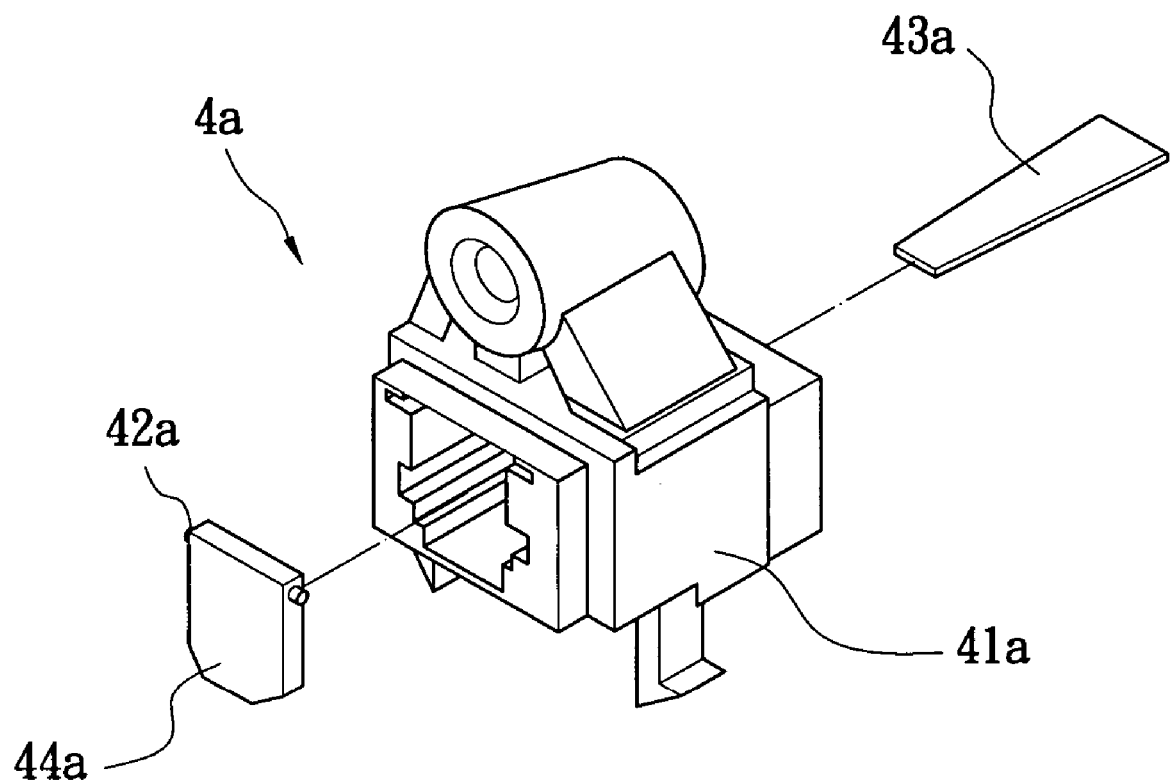
FIG. 4 is a perspective view of a fourth conventional optical fiber connector.
Figure 5:
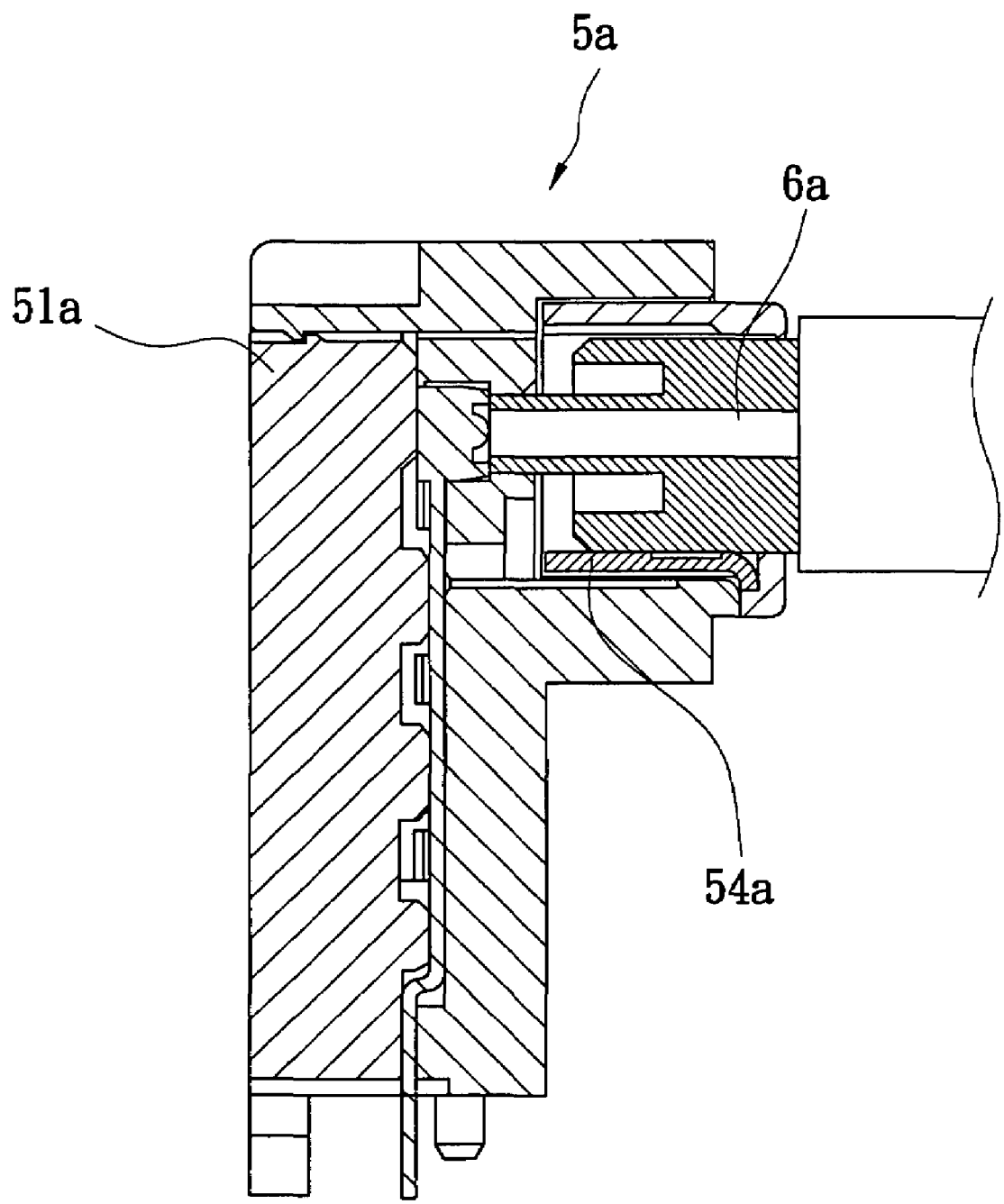
FIG. 5 is a perspective view of a fifth conventional optical fiber connector.
Figure 6A:
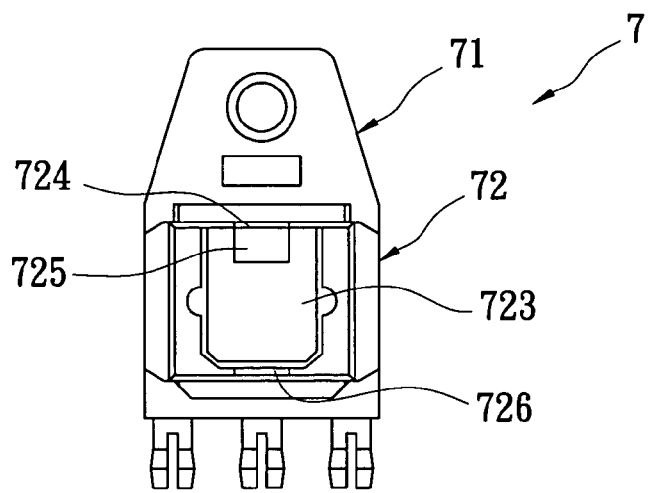
FIG. 6A is a front view of an optical fiber connector according to the present invention.
Figure 6B:
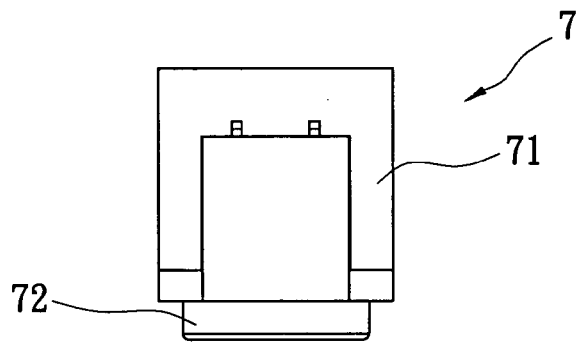
FIG. 6B is a top view of the optical fiber connector according to the present invention.
Figure 6C:
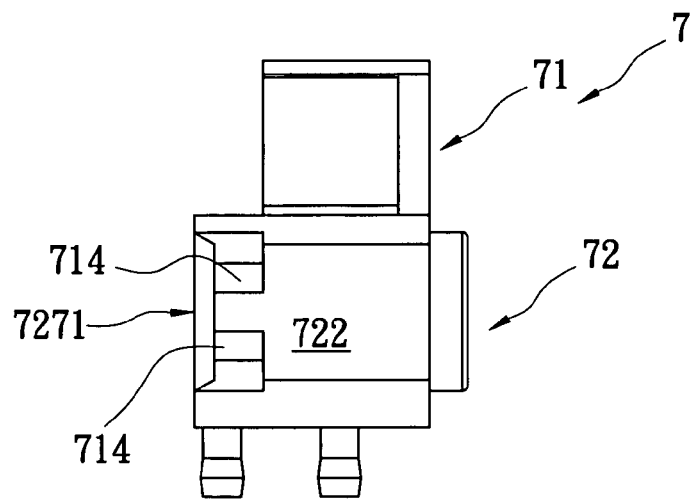
FIG. 6C is a side view of the optical fiber connector according to the present invention.
Figure 11A:
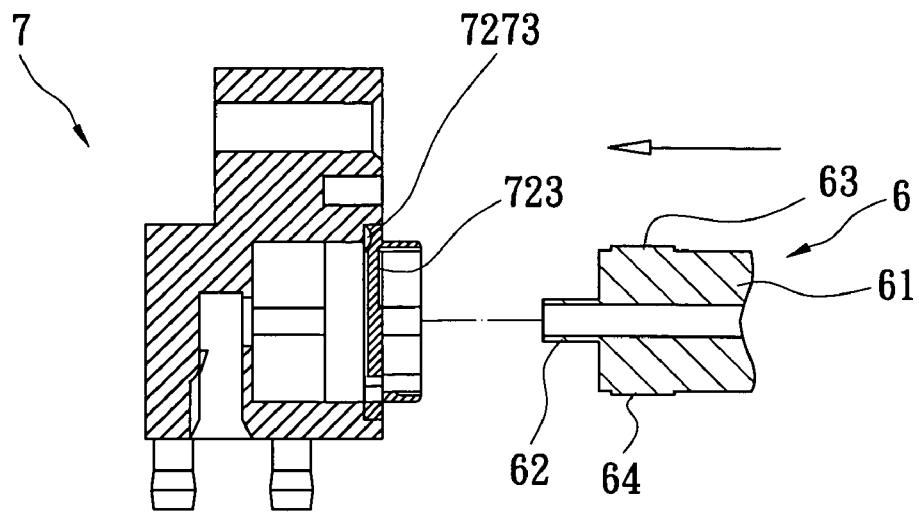
FIG. 11A is a perspective view of the optical fiber connector according to the present invention, before an optical fiber coupling inserts thereinto.

Referring to FIGS. 6A to 6C, the present invention provides an optical fiber connector 7 that mates with an optical fiber coupling 6 (illustrated in FIG. 11A). The optical fiber connector 7 includes a housing 71 and a U-shaped portion 72 assembled to the housing 71. In FIG. 11A, the optical fiber coupling 6 includes a plug 61, two semi-circular strips protruding two opposite lateral sides of the plug 61, top and bottom tenons 63, 64 respectively protruding from top and bottom surfaces of the plug 61, and an insertion head 62 arranged on a front end of the plug 61.

Figure 7A:
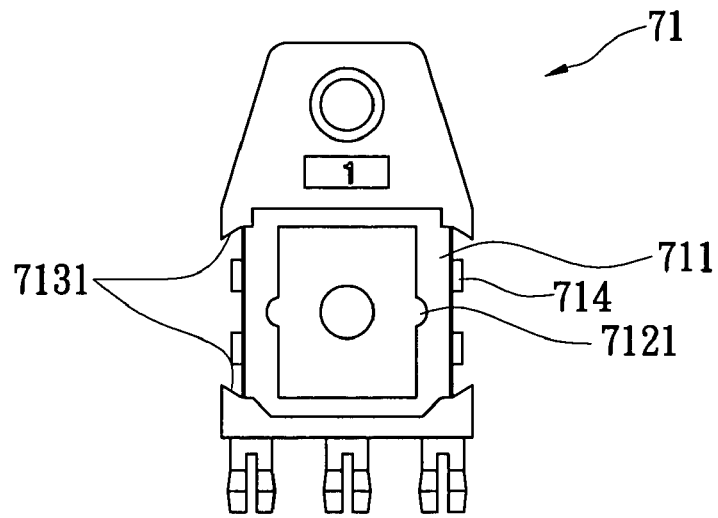
FIG. 7A is a front view of a housing according to the present invention.
Figure 7B:
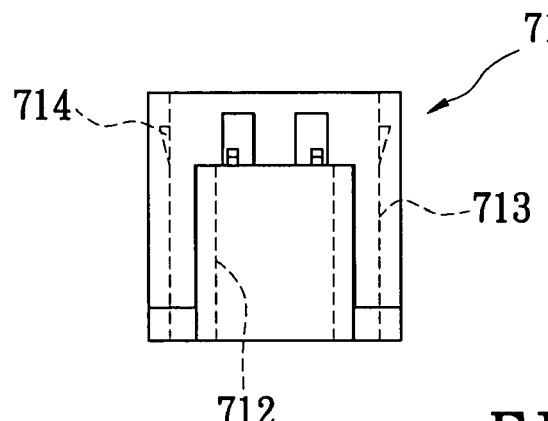
FIG. 7B is a top view of the housing of according to the present invention.
Figure 7C:
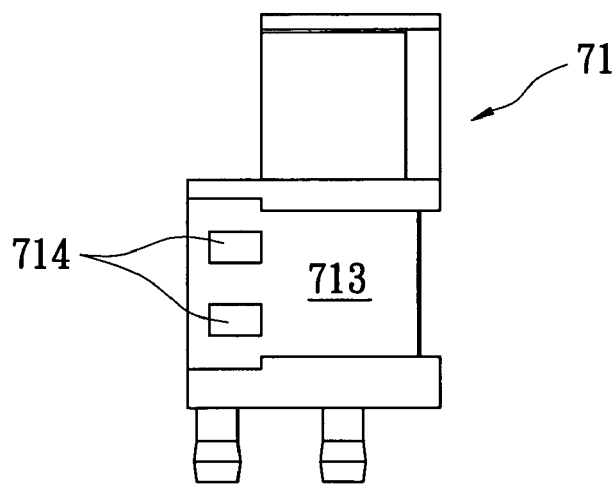
FIG. 7C is a side view of the housing of according to the present invention.

With respect to FIGS. 7A to 7C, the housing 71 includes a base 711, two rear furrows 7121 formed along an insertion direction on two opposite lateral inner surfaces 712 of the base 711. The two rear furrows 7121 respectively relates to the two semi-circular strips. The housing 71 further includes two clamping grooves 7131 respectively arranged on upper and lower edges of each opposite lateral outer surface 713 of the base 711.

Figure 8A:
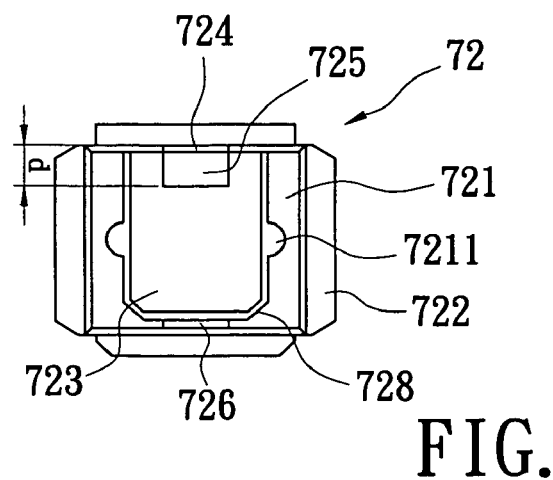
FIG. 8A is a front view of a U-shaped portion of according to the present invention.
Figure 8B:
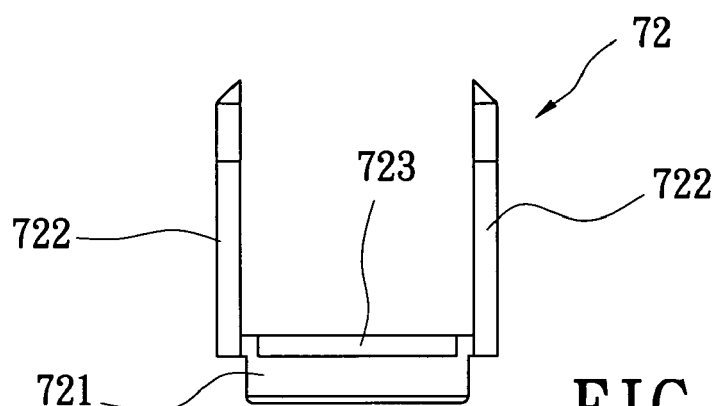
FIG. 8B is a top view of the U-shaped portion of according to the present invention.
Figure 8C:
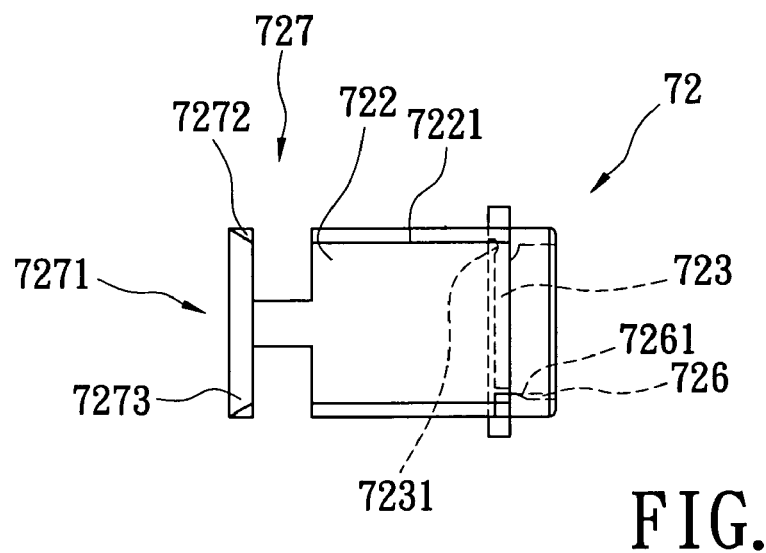
FIG. 8C is a side view of the U-shaped portion of according to the present invention.
Figure 10:
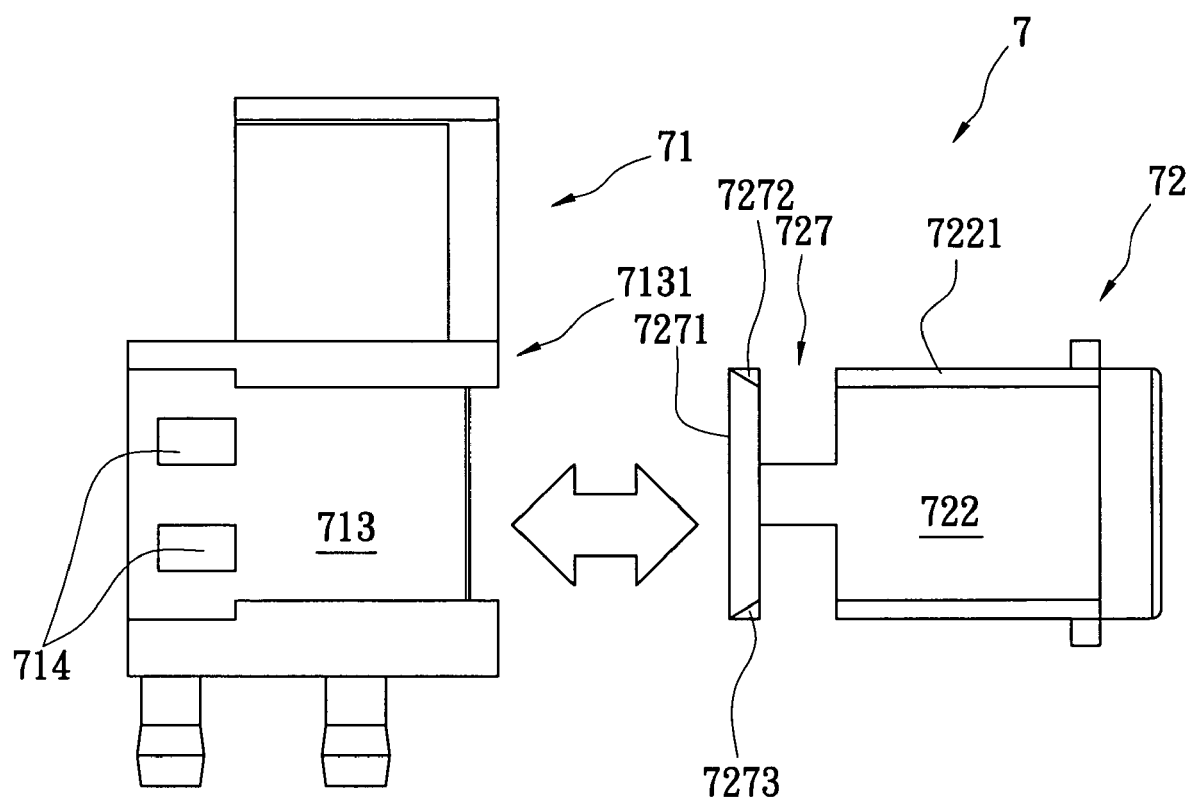
FIG. 10 is a perspective view of an optical fiber connector according to the present invention, when the housing is assembled with the U-shaped portion.

With respect to FIGS. 8A to 8C, the U-shaped portion 72 includes a socket frame 721, and two side plates 722 extending from two sides of the socket frame 721. The socket frame 721 includes two front furrows 7211 formed on two opposite lateral inner surfaces of the socket frame 721 along the insertion direction, and a shutter 723 downwardly extending from an upper front edge thereof. The shutter 723 is made from the U-shaped portion 72 integrally in one piece. Each of the side plates 722 has two engaging faces 7221 respectively retaining in a respective one of the clamping grooves 7131 and formed on upper and lower edges thereof. The two front furrows 7211 communicate with the two rear furrows 7121, respectively. Referring to FIG. 10, the U-shaped portion 72 assembles to the housing 71. Therefore, the U-shaped portion 72 simply and durably connects to the housing 7 is achieved.

With respect to FIGS. 6C, 7C and 8C, the housing 71 includes two embosses 714 respectively disposed on rear portions of the two outer surfaces 713 of the base 711. The U-shaped portion 72 includes two inverted T-shaped tails 727, the inverted T-shaped tails 727 respectively connect rear portions of the two side plates 722 and engage with the two embosses 714 of the base 711 correspondingly.

In FIGS. 6C, 7B, 7C, 8B, 8C, and 10, each of the inverted T-shaped tails 727 includes a horizontal slender head 7271, two lateral guiding inclined surfaces 7272 formed on two opposite lateral sides of the horizontal slender head 7271, and a head inclined surface 7273 arranged on a heading edge of the horizontal slender head 7271. Whereby the inverted T-shaped tails 7271 slidably inserts into the clamping grooves 7131 respectively along the insertion direction, so that the U-shaped portion 72 assembles to the housing 71. Each of the embosses 714 has a wedge cross-sectional profile of a narrow front and a wide rear relatively, so as to allow the horizontal slender head 7271 of a respective one of the inverted T-shaped tails 727 slide from the narrow front towards and to clamp with the wide rear.

Figure 11B:
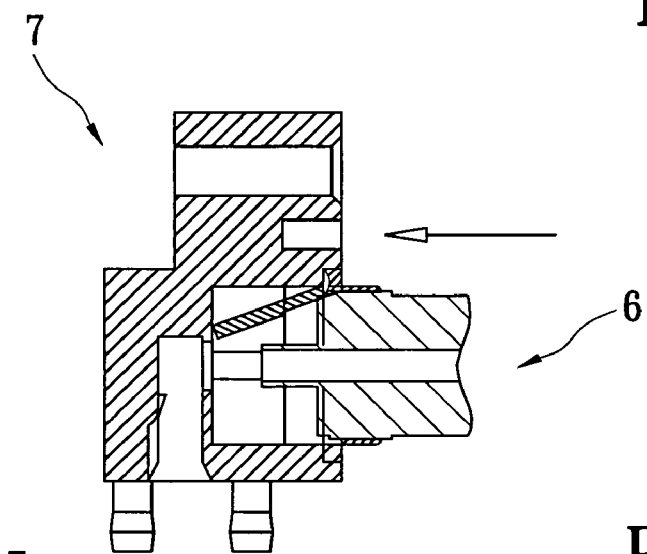

Referring to FIG. 11B, the two rear furrows 7121 of the housing 71 and the two front furrows 7211 of the U-shaped portion 72 both correspond with the two semi-circular strips of the optical fiber coupling 6 for guiding the optical fiber coupling 6.

With respect to FIG. 8C, the U-shaped portion 72 has an indentation 7231 arranged on a rear surface of the shutter 723, the indentation 7231 is adjacent to a joint between the socket frame 721 and the shutter 723, so as to allow the shutter 723 rotate backwards.

Figure 11C:
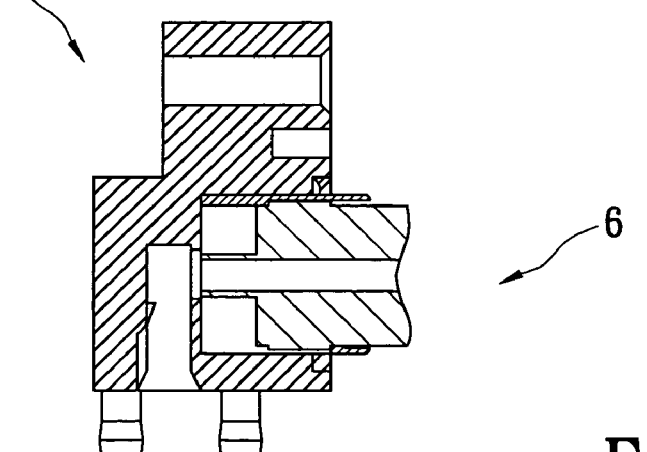
FIG. 11C is a perspective view of the optical fiber connector according to the present invention, after the optical fiber coupling inserts thereinto.

As shown in FIG. 8A, the socket frame 721 has a cutout 724 formed from the upper front edge to communicate with a recess 725 that is concaved on the shutter 723. The cutout 724 defines a predetermined recessed depth same as that of the recess 725, the optical fiber connector defines a predetermined length "d" that extends from the cutout of the socket frame to the recess of the shutter. In FIG. 11B, the cutout 724 mates with the top tenon 63 of the optical fiber coupling 6 to allow the optical fiber coupling 6 slide in. In FIG. 11C, the top tenon 63 of the optical fiber coupling 6 can be moved from the cutout 724 forward the recess 725 along the insertion direction. Thus, the recess 725 with the predetermined recessed depth following the cutout 24 as a continuous guide, and the recess 725 with the predetermined length "d" further controls an insertion depth of the optical fiber coupling 6.

In FIG. 8A, the U-shaped portion 72 has two sliding faces 728 respectively arranged on two opposite lower inner corners of the socket frame 721 for guiding the optical fiber coupling 6. The optical fiber coupling 6 has two relative faces (not shown) mating with the two sliding faces 728, and an idiot-proofing function is provided thereby to avoid any disassembly of the U-shaped portion 72.

In FIG. 8C, the socket frame 721 has a sliding recess 726 that inwardly extends a predetermined distance "b" from a lower front edge, the predetermined distance "b" is formed to relate to the bottom tenon 64 of the optical fiber coupling 6. The socket frame 721 has a guiding inclined face 7261 arranged on a rear portion thereof, shown in FIG. 11C. Thus, the bottom tenon 64 slides smoothly by the guiding inclined face 7261 to mate with the bottom of the socket frame 721, when the optical fiber coupling 6 inserts into the optical fiber connector 7.

Figure 9A:
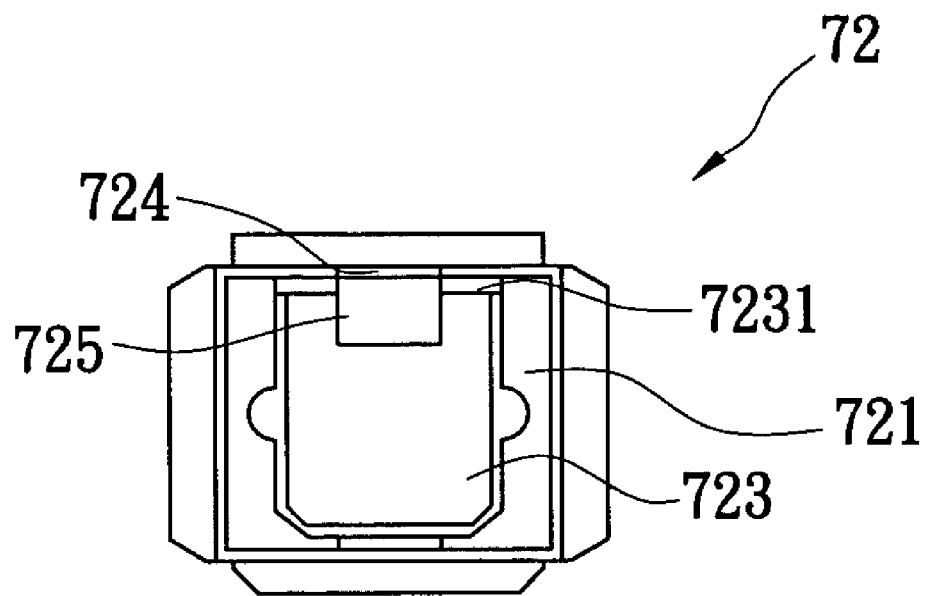
FIG. 9A is a front view of the U-shaped portion according to another embodiment of the present invention.
Figure 9B:
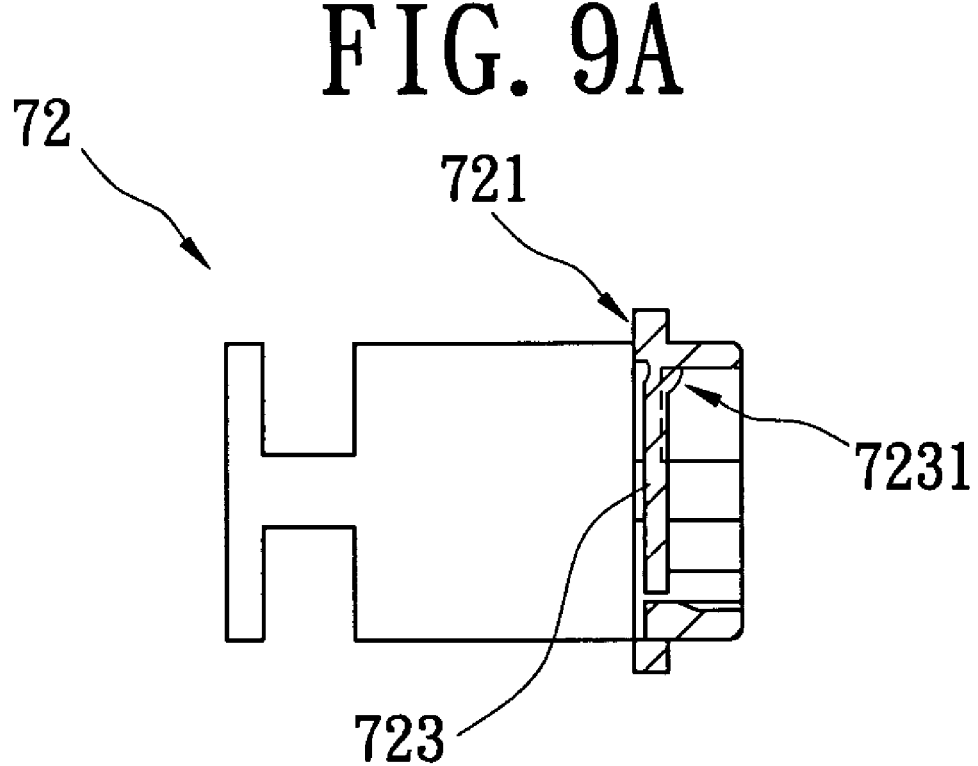
FIG. 9B is a front view of the U-shaped portion according to another embodiment of the present invention.

With respect to FIGS. 9A and 9B, the U-shaped portion 72 is integrally made in one piece via a resilient material. The U-shaped portion 72 has a cambered protrusion 7231 arranged on the front surface of the shutter 723, the cambered protrusion 7231 is adjacent to the joint between the socket frame 721 and the shutter 723 for adjusting a resilient force thereof. The resilient force is determined in proportion to size and location of the cambered protrusion 7231.

The present invention is characterized by:
1. The present invention provides the shutter 723 to enclose an entrance of the socket frame 721 for keeping out dust and external objects.
2. The present invention provides the recess 725 and the sliding recess 726 to restrict insertion depths of the top and the bottom tenons 63, 64 of the optical fiber coupling 6, respectively.
3. The present invention provides the two rear furrows 7121 and the two front furrows 7211 together to guide the two semi-circular strips of the optical fiber coupling 6. The cutout 724 and the sliding recess 726 respectively guide the top and the bottom tenon 63, 64 of the optical fiber coupling 6 for an accurate alignment between the optical fiber coupling 6 and an optoelectronic component disposed in the optical fiber connector 7.
4. The present invention provides that the two clamping grooves 7131 respectively engages with the engaging faces 7221 of the two side plates 722 and the T-shaped tails 727 engages with the embosses 714, in order to provide an completely engagement.
5. The present invention provides that the two sliding faces 728 of the socket frame 721 and the bottom of the optical fiber coupling 6 restrict each other for avoiding disassembly of the U-shaped portion 72.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An optical fiber connector for mating with an optical fiber coupling, comprising:
   a housing; and
   a U-shaped portion connecting with the housing;
   wherein the housing has two clamping grooves respectively arranged on upper and lower edges of each opposite lateral outer surface thereof;
   wherein the U-shaped portion includes a socket frame and two side plates extending from two sides of the socket frame; the socket frame includes a shutter downwardly extending from an upper front edge thereof, and each side plates has two engaging faces respectively retained in a respective one of the clamping grooves and arranged on upper and lower edges thereof.

2. The optical fiber connector claimed as claim 1, wherein the U-shaped portion is integrally made in one piece via a resilient material.

3. The optical fiber connector claimed as claim 1, wherein the socket frame has a cutout formed from the upper front edge to communicate with a recess that is concaved on the shutter, and the cutout defines a predetermined recessed depth same as that of the recess, the optical fiber connector defines a predetermined length that extends from the cutout of the socket frame to the recess of the shutter.

4. The optical fiber connector claimed as claim 1, wherein the socket frame has a sliding recess formed from a lower front edge thereof inwardly to extend with a predetermined distance, the sliding recess relates to a bottom tenon of the optical fiber coupling.

5. The optical fiber connector claimed as claim 4, wherein the socket frame has a guiding inclined face formed on a rear portion thereof.

6. The optical fiber connector claimed as claim 1, wherein the U-shaped portion has an indentation arranged on a rear surface of the shutter, the indentation is adjacent to a joint between the socket frame and the shutter for the shutter rotating backwards.

7. The optical fiber connector claimed as claim 1, wherein the U-shaped portion has a cambered protrusion arranged on a front surface of the shutter, the cambered protrusion is adjacent to a joint between the socket frame and the shutter for adjusting a resilient force thereof, the resilient force is determined in proportion to size and location of the cambered protrusion.

8. The optical fiber connector claimed as claim 1, wherein the base includes two embosses respectively disposed on rear portions of the two outer surfaces, and the U-shaped portion includes two inverted T-shaped tails respectively connecting rear portions of the two side plates to correspondingly engage with the two embosses of the base.

9. The optical fiber connector claimed as claim 8, wherein each of the inverted T-shaped tails includes a horizontal slender head, two lateral guiding inclined surfaces formed on two opposite lateral sides of the horizontal slender head, and a head inclined surface arranged on t a heading edge of the horizontal slender head, whereby the inverted T-shaped tails slidably inserts into the clamping grooves-respectively, so that the U-shaped portion assembles to the housing.

10. The optical fiber connector claimed as claim 8, wherein each of the embosses has a wedge cross-sectional profile of a narrow front and a wide rear relatively, so as to allow the each of the two inverted T-shaped tails slide from the narrow front towards and to clamp with the wide rear.

11. An optical fiber connector for mating with an optical fiber coupling, the optical fiber coupling includes a plug, two semi-circular strips protruding from two opposite lateral sides of the plug, top and bottom tenons respectively protruding from top and bottom surfaces of the plug, and an insertion head arranged on a front end of the plug; and the optical fiber connector comprising:
   a housing having a base, two rear furrows formed on two opposite lateral inner surfaces of the base semi-circular, and two clamping grooves respectively formed on upper and lower edges of each outer surface of the base; and
   a U-shaped portion connecting with the housing, and the U-shaped portion including a socket frame and two side plates extending from two sides of the socket frame;
   wherein the socket frame includes two front furrows formed on two opposite lateral inner surfaces thereof, and a shutter downwardly extending from an upper front edge thereof;
   wherein each of the two side plates has two engaging faces respectively retained in a respective one of the clamping grooves and formed on upper and lower edges thereof, and the two front furrows respectively communicate with the two rear furrows, respectively.

12. The optical fiber connector claimed as claim 11, wherein the U-shaped portion is integrally made in one piece via a resilient material.

13. The optical fiber connector claimed as claim 11, wherein the socket frame has a cutout formed from the upper front edge to communicate with a recess that is concaved on the shutter, the cutout defines a predetermined recessed depth same as that of the recess, the optical fiber connector defines a predetermined length that extends from the cutout of the socket frame to the recess of the shutter.

14. The optical fiber connector claimed as claim 11, wherein the socket frame has a sliding recess formed from a lower front edge thereof inwardly to extend with a predetermined distance, the sliding recess relates to the bottom tenon of the plug.

15. The optical fiber connector claimed as claim 14, wherein the socket frame has a guiding inclined face formed on a rear portion thereof.

16. The optical fiber connector claimed as claim 11, wherein the U-shaped portion has an indentation arranged on a rear surface of the shutter, the indentation is adjacent to a joint between the socket frame and the shutter to allow the shutter rotate backwards.

17. The optical fiber connector claimed as claim 11, wherein the U-shaped portion has a cambered protrusion arranged on a front surface of the shutter, the cambered protrusion is adjacent to a joint between the socket frame and the shutter for adjusting a resilient force thereof, and the resilient force is determined in proportion to size and location of the cambered protrusion.

18. The optical fiber connector claimed as claim 11, wherein the base includes two embosses respectively disposed on rear portions of the two outer surfaces, and the U-shaped portion includes two inverted T-shaped tails respectively connecting to rear portions of the two side plates to correspondingly engage with the two embosses of the base.

19. The optical fiber connector claimed as claim 18, wherein each of the two inverted T-shaped tails includes a horizontal slender head, two lateral guiding inclined surfaces formed on two opposite lateral sides of the horizontal slender head, and a head inclined surface arranged on a heading edge of the horizontal slender head, whereby the inverted T-shaped tails slidably inserts into the clamping grooves respectively, so that the U-shaped portion assembles to the housing.

20. The optical fiber connector claimed as claim 18, wherein each of the embosses has a wedge cross-sectional profile of a narrow front and a wide rear relatively, so as to allow each of the two inverted T-shaped tails slide from the narrow front towards and to clamp with the wide rear.

* * * * *